(12) United States Patent
Yasuda et al.

(10) Patent No.: US 8,720,471 B2
(45) Date of Patent: May 13, 2014

(54) FUEL CUTOFF VALVES

(75) Inventors: Yoshihiro Yasuda, Toyota (JP); Kazumi Haruta, Obu (JP); Takashi Kato, Obu (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 134 days.

(21) Appl. No.: 13/167,823

(22) Filed: Jun. 24, 2011

(65) Prior Publication Data

US 2011/0315241 A1 Dec. 29, 2011

(30) Foreign Application Priority Data

Jun. 28, 2010 (JP) ................................. 2010-146161

(51) Int. Cl.
*F16K 24/04* (2006.01)
(52) U.S. Cl.
USPC ............................................ 137/202; 137/43
(58) Field of Classification Search
USPC ............... 137/38, 39, 43, 202, 409, 429, 587;
141/44–46, 59, 198, 199, 216,
141/301–303
See application file for complete search history.

(56) References Cited

U.S. PATENT DOCUMENTS

| | | | | |
|---|---|---|---|---|
| 4,579,135 A * | 4/1986 | Sakata et al. | .................. | 137/202 |
| 5,680,848 A * | 10/1997 | Katoh et al. | .................. | 137/587 |
| 6,347,640 B1 * | 2/2002 | Meyer | .............................. | 137/43 |
| 6,840,262 B2 * | 1/2005 | Kojima | .......................... | 137/202 |
| 7,571,740 B2 * | 8/2009 | Kaneko et al. | ................ | 137/202 |
| 7,886,759 B2 * | 2/2011 | Miyoshi et al. | ............... | 137/202 |
| 7,934,514 B2 * | 5/2011 | Yamada | ......................... | 137/202 |
| 2001/0050104 A1 * | 12/2001 | Nishi et al. | ..................... | 137/202 |
| 2002/0046770 A1 * | 4/2002 | Hattori et al. | .................. | 137/202 |
| 2003/0106586 A1 * | 6/2003 | Dunkle | .......................... | 137/202 |
| 2007/0284001 A1 * | 12/2007 | Yamada | ......................... | 137/202 |
| 2008/0142087 A1 * | 6/2008 | Muto et al. | ...................... | 137/43 |
| 2012/0037834 A1 * | 2/2012 | Lang et al. | ..................... | 137/202 |

FOREIGN PATENT DOCUMENTS

| | | |
|---|---|---|
| JP | 11511221 A | 9/1999 |
| JP | 2005-194957 | 7/2005 |
| JP | 2007-127017 | 5/2007 |
| JP | 2007-331448 | 12/2007 |
| JP | 2008-149811 | 7/2008 |
| WO | 9706973 | 2/1997 |

OTHER PUBLICATIONS

Japanese Office Action mailed Sep. 10, 2013, corresponding to Japanese Patent Application No. 2010-146161; with English language translation.

* cited by examiner

*Primary Examiner* — John K Fristoe, Jr.
*Assistant Examiner* — Craig J Price
(74) *Attorney, Agent, or Firm* — Ladas & Parry LLP

(57) ABSTRACT

A fuel cutoff valve has a housing defining therein a float chamber and a float disposed in the float chamber. The housing defines a connection passage positioned above the float chamber and fluidly connecting the float chamber with outside of the housing and a hole positioned below the fluid chamber fluidly connecting the float chamber with outside of the housing. The float has a valve part that is configured to close the connection passage and defines therein a first passage passing through the float in a vertical direction and a second passage extending from a part of the first passage to an outer surface of the float in a substantial horizontal direction.

2 Claims, 7 Drawing Sheets

FUEL CUTOFF VALVES

CROSS-REFERENCES TO RELATED APPLICATIONS

This application claims priority to Japanese patent application serial number 2010-146161, the contents of which are incorporated herein by reference.

BACKGROUND OF THE INVENTION

1. Field of the Invention

This disclosure relates to fuel cutoff valves each attached to a fuel tank of a vehicle such as gas vehicle.

2. Description of the Related Art

A vehicle such as gasoline vehicle has a fuel tank provided with a fuel cutoff valve. The fuel cutoff valve allows fluid communication between an inner space of the fuel tank and outside of the fuel tank (for example, adsorbent canister) in a normal condition, and prevents fuel from flowing outside the fuel tank in conditions that the vehicle is inclined or overturns, etc.

Japanese Laid-Open Patent Publication No. 2005-194957 discloses a conventional fuel cutoff valve as shown in FIGS. 13 an 14. FIG. 13 shows a cross-sectional view of the fuel cutoff valve in an open state. FIG. 14 is a cross-sectional view of the fuel cutoff valve in a closed state. As shown in FIG. 14, a fuel cutoff valve 101 is attached to an upper section of a fuel tank 110 and is composed of a case 102 and a float valve body 103. The case 102 defines a float chamber 107 and a connection path 102b therein. The float chamber 107 is fluidly communicated with an inner space of the fuel tank 110. The connection path 102b is fluidly communicated with an upper end of the float chamber 107 via a communication opening 104a. The connection path 102b is fluidly communicated with an adsorbent canister. The float valve body 103 is disposed in the float chamber 107 such that the float valve body 103 can move upwardly and downwardly. When the float valve body 103 is at a lower position, the communication opening 104a is open (FIG. 13), whereas when the float valve 103 is at an upper position, the communication opening is closed (FIG. 14). A valve spring 105 is disposed between the float valve body 103 and a bottom wall 102d for the float chamber 107. The valve spring 105 biases the float valve body 103 upwardly in order to assist upward movement of the float valve body 103 due to buoyant force. However, spring force of the valve spring 105 is too weak to elevate the float valve body 103 by oneself. The bottom wall 102d for the float chamber 107 has a plurality of communication holes 102a for fluidly communicating the float chamber 107 with the inner space of the fuel tank 110. In the fuel cutoff valve 101, an upper space 108 is defined between an upper wall for the float chamber 107 and an upper surface of the float valve body 103 (FIG. 13), and a lower space 109 is defined between the lower wall 102d for the float chamber 107 and a lower surface of the float chamber 103 (FIG. 14). The float valve body 103 defines communication passages 103b therethrough.

When a vehicle equipped with the fuel cutoff valve 101 is in a normal condition (FIG. 13), the float valve body 103 is at the lower position and the communication opening 104a is open. Thus, fuel vapor vaporized in the fuel tank 110 can flow through the communication holes 102a, the communication passage 103b, the float chamber 107, the communication opening 104a and the connection path 102b toward the outside of the fuel tank 110. When the vehicle overturns or banks, the liquid fuel flows into the float chamber 107 via the communication holes 102a. Thus, the float valve body 103 moves upwardly due to buoyant force such that the communication opening 104a is closed (FIG. 14). Accordingly, because fluidly communication between the float chamber 107 and the connection path 102b is blocked, it is able to prevent the fuel from flowing out of the fuel tank 110.

When the vehicle returns to the normal condition, the fuel in the float chamber 107 flows into the fuel tank 110 via the communication holes 102a. Thus, the flow valve body 103 moves downwardly, and the communication opening 104a is opened (FIG. 13).

In order to reduce unintentional movement of the float valve 103 in a horizontal direction, a space 112 between the float valve 103 and an inwardly facing surface of the case 102 is preferably narrowed. However, when the space 112 is narrowed, the fuel is likely to remain in the space 112 during discharge of the fuel from the float chamber 107. Thus, there has been a need for improved fuel cutoff valve.

SUMMARY OF THE INVENTION

One aspect of this disclosure includes a fuel cutoff valve has a housing defining therein a float chamber and a float disposed in the float chamber. The housing defines a connection passage positioned above the float chamber and fluidly connecting the float chamber with outside of the housing and a hole positioned below the fluid chamber fluidly connecting the float chamber with outside of the housing. The float has a valve part that is configured to close the connection passage and defines therein a first passage passing through the float in a vertical direction and a second passage extending from a part of the first passage to an outer surface of the float in a substantial horizontal direction.

In accordance with this aspect, when discharging liquid from the float chamber, the liquid between the outer surface of the float and an inwardly facing surface of the housing can easily flow into the first passage via the second passage. Thus, it is able to prevent the fuel from remaining in such space and thus to improve discharging efficiency of the liquid.

DETAILED DESCRIPTION OF THE PREFERRED EMBODIMENTS

Each of the additional features and teachings disclosed above and below may be utilized separately or in conjunction with other features and teachings to provide improved fuel cutoff valves. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
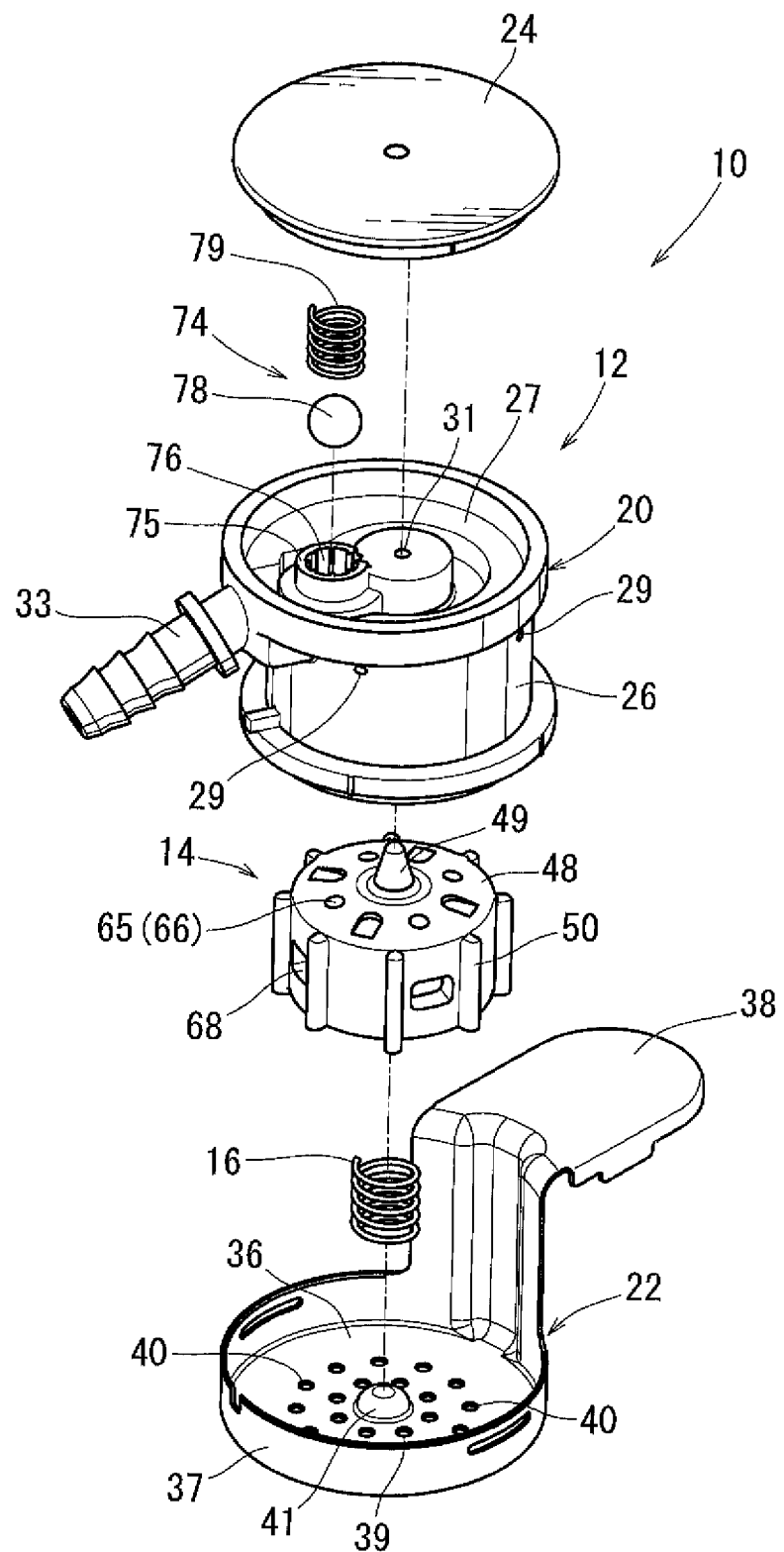
FIG. 1 is an exploded perspective view of a fuel cutoff valve.

A first embodiment of this disclosure will be described. As shown in FIG. 1, a fuel cutoff valve 10 is composed of a case 12, a float valve body 14 and a valve spring 16. The fuel cutoff valve 10 is mounted on an upper section (for example, upper wall) of a fuel tank for vehicle.

Figure 2:
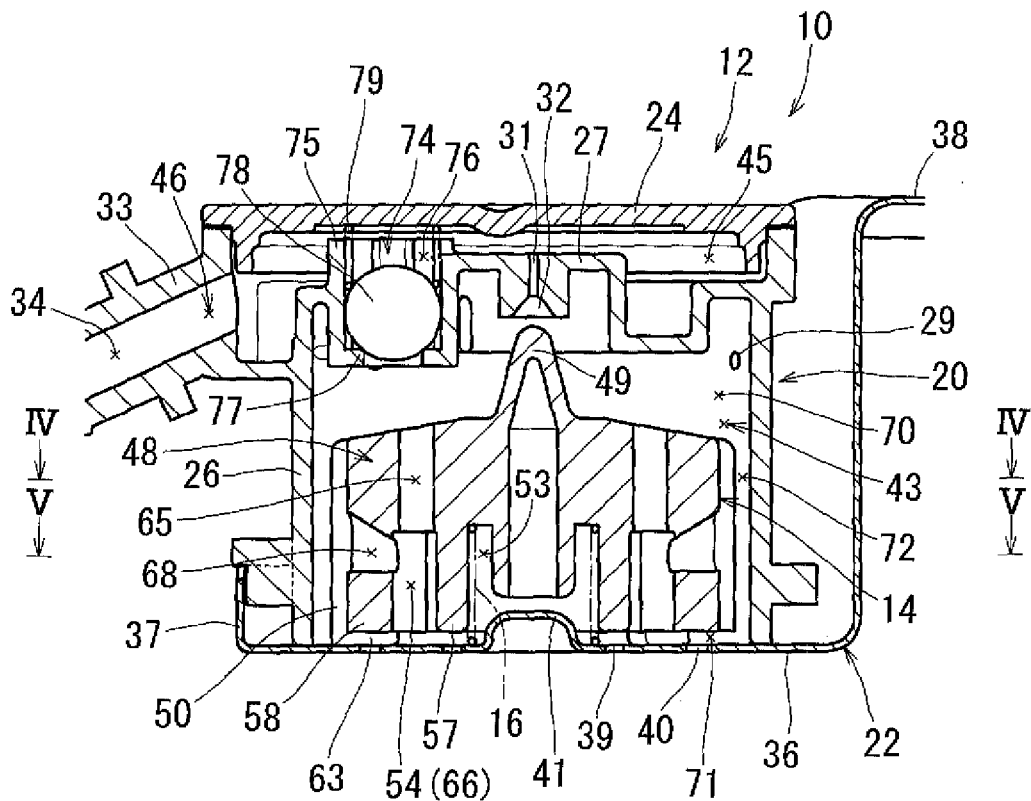
FIG. 2 is a cross-sectional view of the fuel cutoff valve in an open state.

The case 12 is composed of a case body 20, a retainer 22, and a cover 24. These components will be described sequentially. As shown in FIG. 2, the case body 20 has a hollow cylinder wall 26 having upper and lower openings and an upper wall 27. The upper wall 27 is integrated with the cylinder wall 26 such that the upper wall 27 is positioned lower than an upper end of the cylinder wall 26 by a predetermined distance and the upper wall 27 divides an inner space of the cylinder wall 26 into two spaces in an axial direction. The cylinder wall 26 defines a plurality of ventilation holes 29 passing therethrough in a radial direction and positioned near and below the upper wall 27. The ventilation holes 29 are equally spaced in a circumference direction of the cylinder wall 26.

The upper wall 27 defines a communication hole 31 at a center region thereof such that the communication hole 31 passes through the upper wall 27 in a vertical direction. The upper wall 27 has a valve seat 32 at a lower opening of the communication hole 31. The case body 20 has a connection pipe 33 extending outwardly from an upper section of the cylinder wall 26 (FIG. 2). The connection pipe 33 defines therein a connection path 34. The case body 20 is integrally formed of, for example, resin materials.

Figure 7:
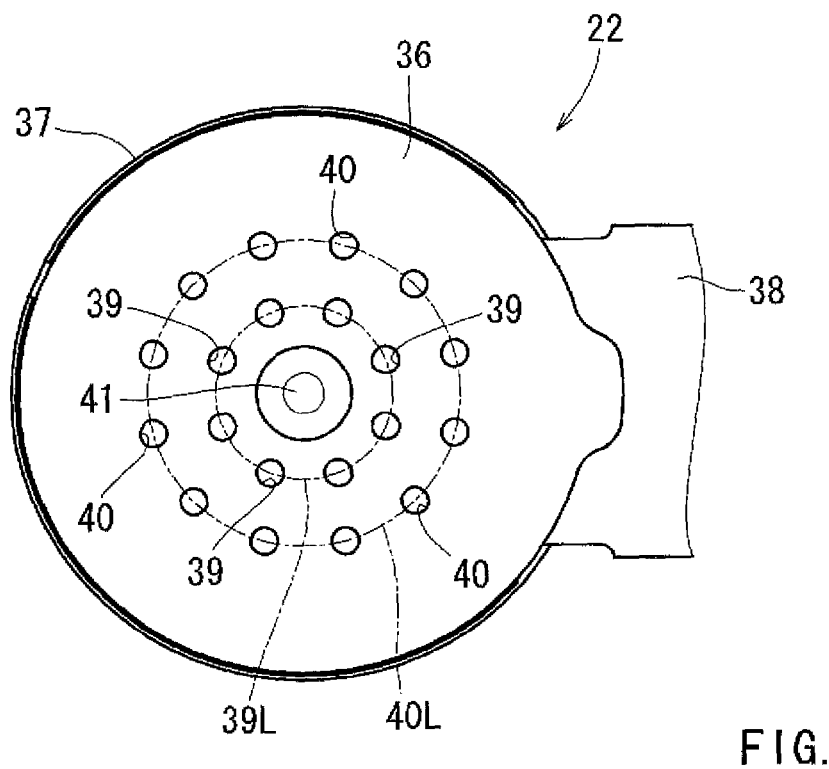
FIG. 7 is a top view of a bottom wall of a retainer.

Next, the retainer 22 will be described. As shown in FIG. 1, the retainer 22 is composed of a circular-shaped bottom wall 36, a side wall 37 formed in a cylinder shape extending from a circumference edge of the bottom wall 36, and a connector 38 having an L-shape extending upwardly from the side wall 37 and then outwardly in the radial direction. As shown in FIG. 7, the bottom wall 36 of the retainer 22 has a plurality of inner communication holes 39 and a plurality of outer communication holes 40 that pass through the bottom wall 36 in a thickness direction of the bottom wall 36. The communication holes 39 and 40 are formed in the circular shape and have the same diameter. The inner communication holes 39 are positioned along an inner circle 39L concentric with the bottom wall 36 and equally spaced in the circumference direction. On the other hand, the outer communication holes 40 are positioned along an outer circle 40L concentric with the bottom wall 36 and equally spaced in the circumference direction. In this embodiment, the number of the inner communication holes 39 is eight, whereas the number of the outer communication holes 40 is twelve. The bottom wall 36 concentrically has a convex portion 41 formed in a hemispheric shape at a center region (FIG. 1).

The retainer 22 is integrally formed by, for example, press forming of a metal plate. Thus, the communication holes 39 and 40 are formed by, e.g., punching the bottom wall 36 of the retainer 22. Preferably, such punching and press forming are simultaneously carried out, however they can be separately carried out. Preferably, shaping of the convex portion 41 and at least one of punching process for the communication holes 39, 40 and press forming process for the retainer 22 are carried out simultaneously, however they can be carried out separately.

As shown in FIG. 2, the retainer 22 receives a lower end of the case body 20 such that the side wall 37 is positioned around the cylinder wall 26 of the case body 20. Thus, the bottom wall 36 of the retainer 22 closes the lower opening of the cylinder wall 26 of the case body 20 such that a float chamber 43 is defined in the case body 20. Because the bottom wall 36 of the retainer 22 works as a bottom wall for the float chamber 43, the bottom wall 36 can be called as "bottom wall 36 for the float chamber 43". An upper section of the connector 38 that extends outwardly is configured to be fixed to a lower surface of an upper wall of the fuel tank, e.g., by welding.

Next, the cover 24 will be described. As shown in FIG. 1, the cover 24 is formed in a circular plate shape and integrally made of, e.g., resin materials. The cover 24 is attached to the cylinder wall 26 of the case body 20 (FIG. 2). Thus, the cover 24 closes the upper opening of the cylinder wall 26 of the case body 20 such that a communication chamber 45 is defined in the case body 20 (i.e., between the cover 24 and the upper wall 27 of the case body 20). The communication chamber 45 is fluidly communicated with the float chamber 43 via the communication hole 31. The communication chamber 45 is also fluidly communicated with the connection path 34 of the connection pipe 33. The communication chamber 45 and the connection path 34 form a connection passage 46. The connection pipe 33 is configured to be connected with an adsorbent canister via a pipe member such as hose.

Figure 8:
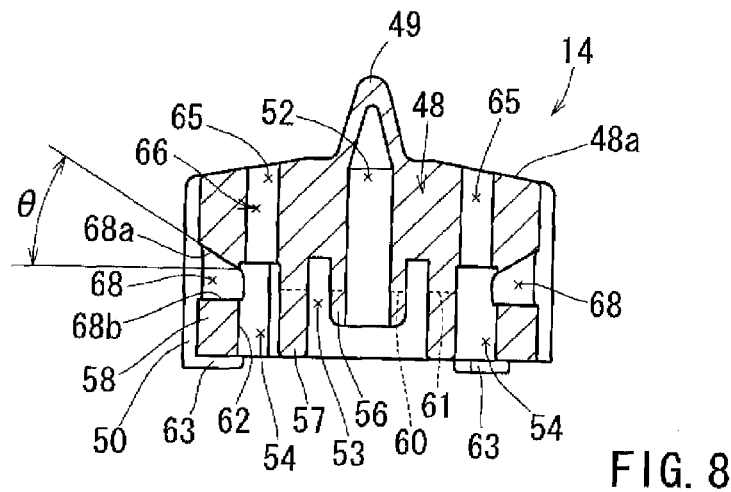
FIG. 8 is a cross-sectional view of a float valve body.
Figure 9:
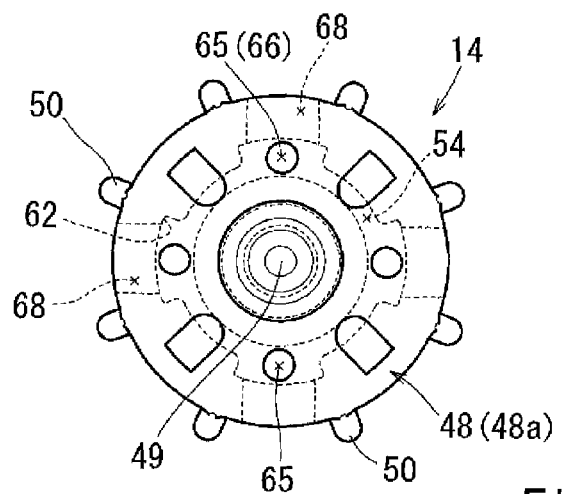
FIG. 9 is a top view of the float valve body.

Next, the float valve body 14 will be described. As shown in FIG. 8, the float valve body 14 is composed of a cylinder shaped valve body 48 and a conical valve part 49 protruding upwardly from a center region of the valve body 48. The valve body 48 has an upper surface 48a slightly inclined downwardly in a radial direction such that a center region of the upper surface 48a is higher than a circumferential edge of the upper surface 48a. The valve body 48 has a plurality of (eight in this embodiment) ribs 50 extending in the axial direction on an outer circumference surface such that the ribs 50 are equally spaced in the circumference direction (FIGS. 1 and 9).

As shown in FIG. 8, the valve body 48 concentrically defines therein a center space 52 having a cylinder shape. An upper end of the center space 52 is positioned near the valve part 49, whereas a lower end of the center space 52 opens at a lower surface of the valve body 48. The valve body 48 concentrically defines an inner annular space 53 and an outer annular space 54 therein. Upper ends of the annular spaces 53 and 54 are positioned at about half of the height of the valve body 48, and lower ends of the annular spaces 53 and 54 open at the lower surface of the valve body 48. Here, the valve body 48 has a small cylinder portion 56 formed in a hollow cylinder shape between the center space 52 and the inner annular space 53, a middle cylinder portion 57 formed in a hollow cylinder shape between the inner annular space 53 and the outer annular space 54, and a large cylinder portion 58 formed in a hollow cylinder shape around the outer annular space 54.

Figure 10:
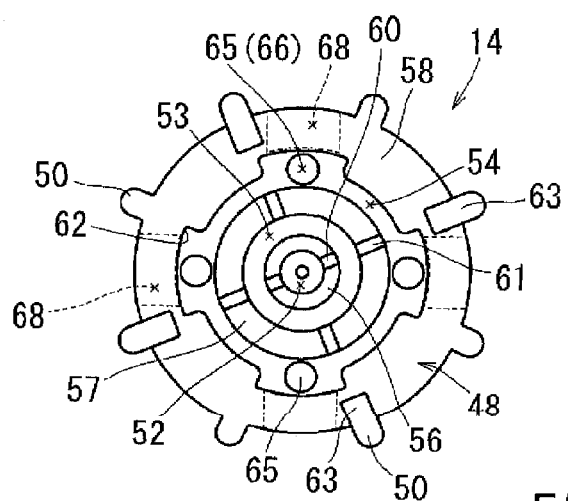
FIG. 10 is a bottom view of the float valve body.

A lower end of the small cylinder portion 56 is positioned higher than the lower surfaces of the middle cylinder portion 57 and the large cylinder portion 58 such that a lower section of the center space 52 and a lower section of the inner annular space 53 are connected with each other. The lower surfaces of the middle cylinder portion 57 and the large cylinder portion 58 are on a same plane and correspond to "lower surface of float valve body" therein. As shown in FIGS. 8 and 10, a plurality of (two in this embodiment) inner grooves 60 extending in the radial direction are formed on the lower surface of the small cylinder portion 56 and are equally spaced in the circumference direction. In addition, a plurality of (four in this embodiment) outer grooves 61 extending in the radial direction are formed on the lower surface of the middle cylinder portion 57 and equally spaced in the circumference direction.

As shown in FIGS. 8 and 10, an inwardly facing surface of the large cylinder portion 58 has a plurality of (four in this embodiment) grooves 62 extending in the axial direction and equally spaced in the circumference direction. The large cylinder portion 58 integrally has on its lower surface a plurality of (four in this embodiment) elongated support projections 63 that are equally spaced in the circumference direction. Each of the support projections 63 extends in the radial direction of the large cylinder portion 58 and has an inner end positioned at a middle portion of the large cylinder portion 58 in the radial direction and an outer end positioned at an outer edge of the large cylinder portion 58 in the radial direction. In this embodiment, each pair of the support projections 63 and the ribs 50 is integrated with each other.

As shown in FIGS. 8 and 9, the valve body 48 has a plurality of (four in this embodiment) straight-shaped through-bores 65 passing therethrough in the axial direction and equally spaced in the circumference direction. Each of the through-bores 65 opens at the upper surface 48a of the valve body 48 and opens at an upper end of the outer annular space 54. In this embodiment, each of the through-bores 65 opens at the upper end of the outer annular space 54 where a width of the upper end in the radial direction becomes wider due to forming the grooves 62 (FIG. 10). The through-bores 65 and the outer annular space 54 forms a first communication passage 66. Each of the through-bores 65 has, for example, a circular shape in a cross-section vertical to its axis.

Figure 5:
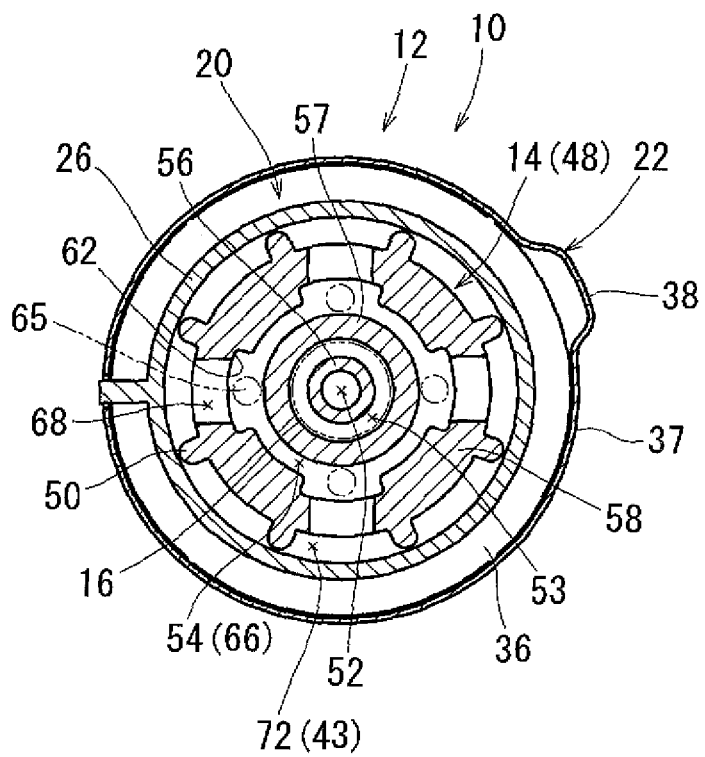
FIG. 5 is a cross-sectional view along V-V line in FIG. 2.

As shown in FIG. 8, the valve body 48 has a plurality of (four in this embodiment) second communication passages 68 extending inwardly from an outer circumferential surface of the large cylinder portion 58 in the radial direction and equally spaced in the circumferential direction. Each of the second communication passages 68 is formed between a pair of the ribs 50 that are adjacent to each other such that two of the second communication passages 68 are not positioned on both sides of one of the ribs 50 (FIG. 5). Each of the second communication passages 68 opens at an upper section of the outer annular space 54 of the first communication passage 66. In detail, each of the second communication passages 68 opens at a bottom surface of each groove 62. Each of the second communication passages 68 is formed in, for example, a horizontally long square shape in a cross-section vertical to its axis (FIG. 1). A lower end of each second communication passage 68 is defined by a horizontal surface 68b extending in the radial direction.

As shown in FIG. 8, an upper end of each second communication passage 68 is defined by an inclined surface 68a that has inclined angle θ and that is inclined upwardly toward its outer end. For example, the inclined angle θ is set at about 30 degree. Thus, each of the second communication passages 68 is formed in a trapezoidal shape in a vertical cross-section along its axis (FIG. 8). In this embodiment, each of the second communication passages 68 and each of the through-bores 65 of the first communication passages 66 are formed at same positions in the circumferential direction (FIG. 5). Here, the second communication passages 68 and the through-bores 65 may be formed at different positions in the circumferential direction. For example, the float valve body 14 is integrally formed from resin materials.

Figure 4:
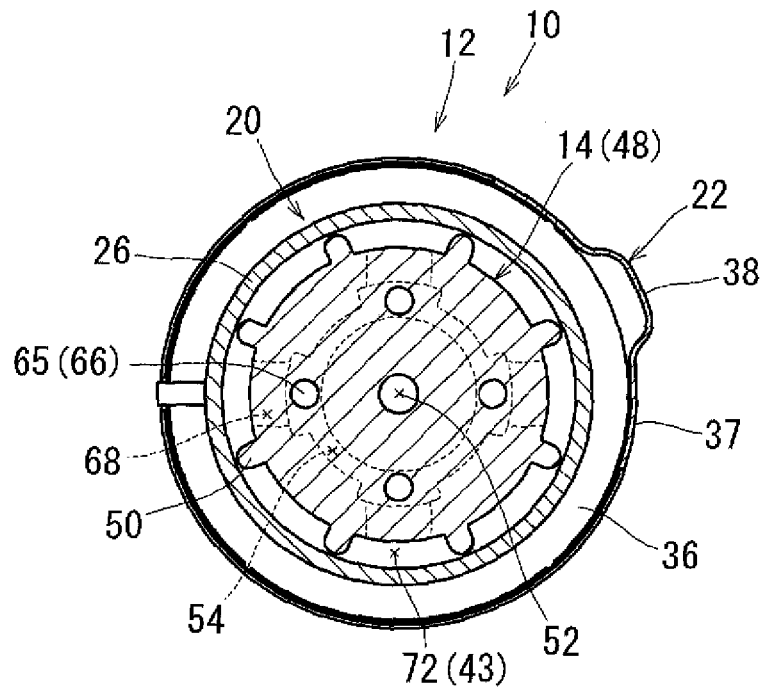
FIG. 4 is a cross-sectional view along IV-IV line in FIG. 2.

The float valve body 14 is disposed in the float chamber 43 such that the float valve body 14 can move in the vertical direction (FIG. 2). The ribs 50 of the float valve body 14 contact with or are adjacent to an inwardly facing surface of the cylinder wall 26 that defines a circumferential edge of the float chamber 43 (FIGS. 4 and 5). Thus, the inwardly facing surface of the cylinder wall 26 guides vertical movement of the float valve body 14 in order to reduce backlash of the float 14 in the radial direction.

As shown in FIG. 2, in the float chamber 43 where the float valve body 14 is disposed, an upper space 70 is defined between the upper wall 27 (in detail, a lower surface thereof) for the float chamber 43 and the float valve body 14 (in detail, an upper surface of the valve body 48). On the other hand, a lower space 71 is defined between the bottom wall 36 (in detail, an upper surface thereof) and the float valve body 14 (in detail, the lower surfaces of the middle cylinder portion 57 and the large cylinder portion 58 of the valve body 48). In addition, a connection space 72 is defined between the inwardly facing surface of the cylinder wall 26 and the float valve body 14 (in detail, the outer circumference surface of the valve body 48). The ribs 50 of the float valve body 14 divide the connection space 72 in the circumferential direction (FIG. 4). The connection space 72 fluidly connects the upper space 70 with the lower space 71. In addition, the upper space 70 and the lower space 71 are fluidly communicated with each other in the vertical direction via the first communication passage 66. The second communication passages 68 fluidly communicate the first communication passage 66 (in detail, the outer annular space 54) with the connection space 72 in the horizontal direction (radial direction of the float valve body 14).

Next, the valve spring 16 will be described. As shown in FIG. 1, the valve spring 16 is composed of a coil spring and is disposed between the retainer 22 and the float valve body 14. In detail, an upper portion of the valve spring 16 is inserted into the inner annular space 53 of the float valve body 14. On the other hand, a lower portion of the valve spring 16 is engaged with the convex portion 41 of the retainer 22 (FIG. 2).

In a state that the vehicle is in a normal condition, the float valve body 14 is in a lower position due to gravity force such that the support projections 63 contact with the bottom wall 36 for the float chamber 43 (FIG. 2). Thus, when the float valve body 14 is in the lower position, it is able to keep the lower space 71 between the lower surface of the float valve body 14 and the upper surface of the bottom wall 36. In this state, the valve spring 16 cannot move the float valve body 14 upwardly. However, when liquid fuel flows into the float chamber 43, the valve spring 16 assists in upward movement of the float valve body 14 caused by buoyant force.

Figure 3:
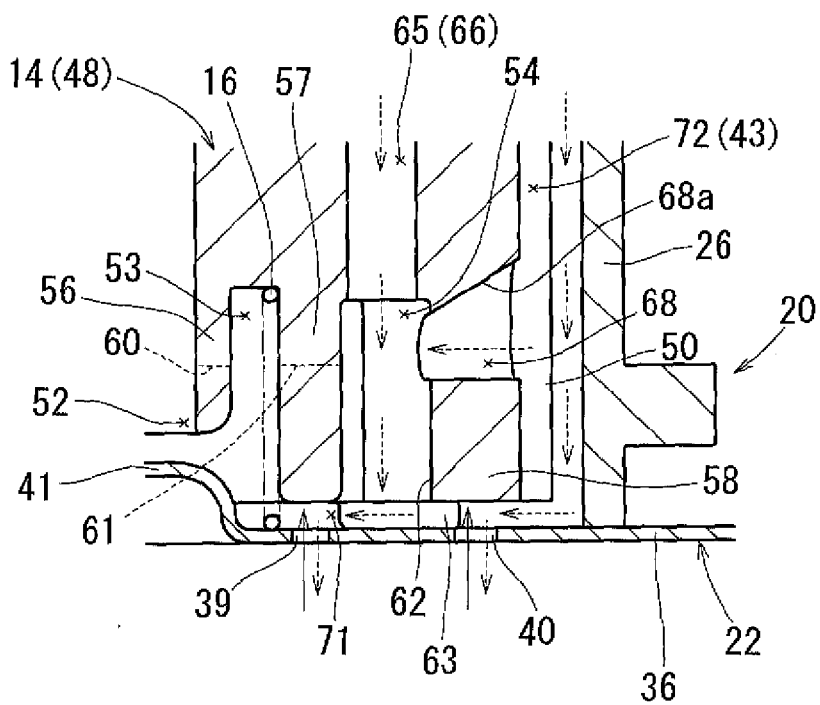
FIG. 3 is an enlarged cross-sectional view showing a part of the fuel cutoff valve shown in FIG. 2.

As shown in FIG. 3, the inner communication holes 39 of the retainer 22 face the lower surface of the middle cylinder portion 57 of the float valve body 14. The outer communication holes 40 of the retainer 22 face the lower surface of the large cylinder portion 58 of the float valve body 14. That is, the inner communication holes 39 and the outer communication holes 40 are positioned not to face the inner annular space 53 and the outer annular space 54.

As shown in FIG. 2, the fuel cutoff valve 10 has a relief valve 74. The relief valve 74 is composed of a valve housing 75, a valve body 78, and a relief spring 79 (FIG. 1). The valve housing 75 is integrally formed in a portion (left portion in FIG. 2) of the upper wall 27 of the case body 20 and is shaped in a hollow cylinder shape extending in the vertical direction. The valve housing 75 defines therein a relief passage 76 fluidly connecting the communication chamber 45 with the float chamber 43 (in detail, the upper space 70). The valve housing 75 has at its lower end a valve seat 77 formed in a flange shape extending inwardly in the radial direction. The valve body 78 is formed in, for example, a ball shape and is disposed in the relief passage 76 such that the valve body 78 can move in the vertical direction. The valve body 78 can contact with and move away from the valve seat 77 depending on its vertical movement. The relief spring 79 is composed of a coil spring and is disposed between the valve body 78 and the cover 24. The relief spring 79 always presses the valve body 78 in a valve-closing direction, i.e., downward direction.

Next, operations of the fuel cutoff valve 10 will be described. When the vehicle is in the normal condition, because fluid level of the fuel in the fuel tank is lower than the fuel cutoff valve 10, there is no fuel in the float chamber 43. Thus, the float valve body 14 is in the lower position in the float chamber 43 due to gravity force (FIG. 2). In this state, the valve part 49 of the float valve body 14 is positioned away from the valve seat 32 of the case 12, so that the communication hole 31 is open, i.e., the fuel cutoff valve 10 is open. In this open state, fuel vapor vaporized in the fuel tank flows into the float chamber 43 (in detail, the lower space 70, the connection space 72 and the upper space 71) via the communication holes 39 and 40, and then flows through the communication hole 31 and the connection passage 46 (the communication chamber 45 and the connection path 34) and to the exterior (adsorbent canister). Simultaneously, the fuel vapor flows into the first communication passage 66 and the second communication passages 66 of the float valve body 14.

Figure 6:
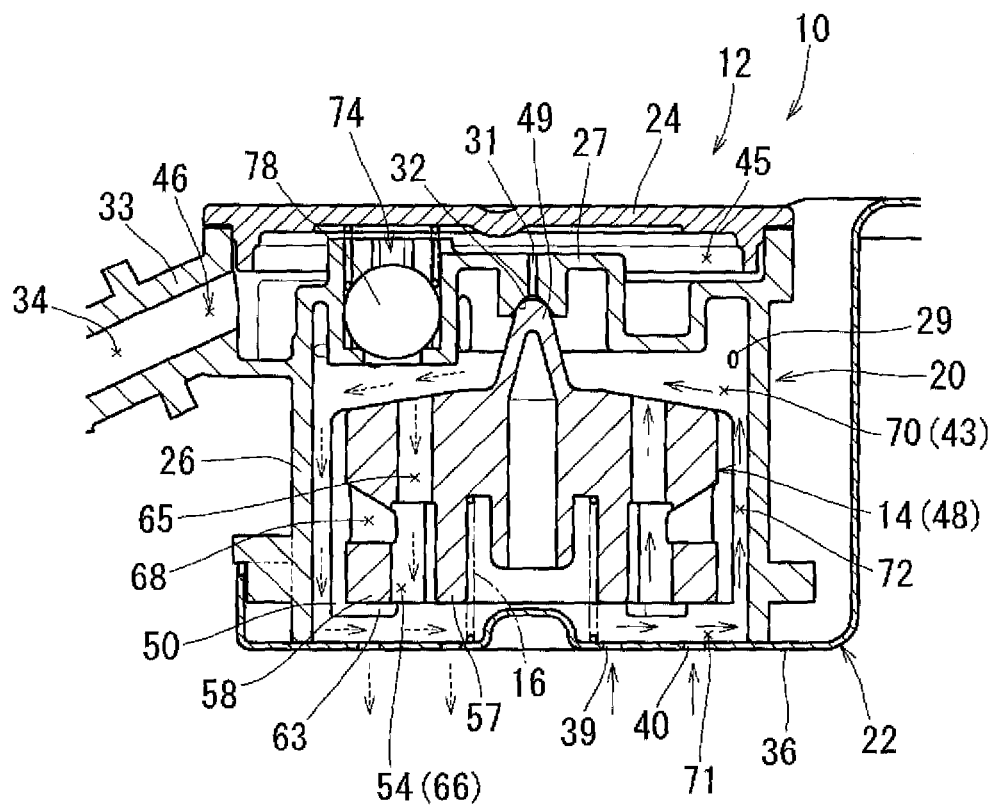
FIG. 6 is a cross-sectional view of the fuel cutoff valve in a closed state.

When the vehicle is inclined or overturns, the fuel in the fuel tank flows into the float chamber 43. In this case, the fuel flows into the float chamber 43 (the lower space 71, the connection space 72 and the upper space 70) via the communication holes 39 and 40 of the case 12. Simultaneously, the fuel flows into the first communication passage 66 and the second communication passages 68. Here, solid arrows in FIG. 6 show such flow of the fuel.

In this way, when the fuel flows into the float chamber 43, the float valve body 14 moves upwardly toward the upper position due to buoyant force. Thus, the valve part 49 of the float valve body 14 contacts with the valve seat 32 of the case 12 such that the communication hole 31 is closed, i.e., the fuel cutoff valve 10 is closed (FIG. 6). In this closed state, fluid connection between the float chamber 43 and the communication hole 31 is blocked, so that it is able to prevent the fuel reserved in the fuel tank from flowing to the exterior of the fuel tank (adsorbent canister).

When the vehicle is returned from inclined or overturning condition to the normal condition, the fuel in the float chamber 43 flows into the fuel tank along an efflux pathway that is reverse of a described influx pathway. That is, the fuel in the upper space 70 of the float chamber 43 flows into the lower space 71 via the first communication passage 66 and the connection space 72, and then flows into the fuel tank via the communication holes 39 and 40. Simultaneously, the fuel in the connection space 72 can easily flow to the first communication passage 66 via the second communication passages 68. Here, dot-line arrows in FIGS. 3 and 6 show such flow of the fuel.

Because the inner annular space 53 and the outer annular space 54 are fluidly connected with each other via the outer grooves 61 of the middle cylinder portion 57, the fuel in the outer annular space 54 can flow to the inner annular space 53 via the outer grooves 61. In addition, because the center space 52 and the inner annular space 53 are fluidly connected with each other, the fuel in the inner annular space 53 can flow into the center space 52. In this way, the fuel can easily flow from the outer annular space 54 to the inner annular space 53 and from the inner annular space 53 to the center space 52. Accordingly, it is able to improve discharging efficiency of the fuel.

Figure 11:
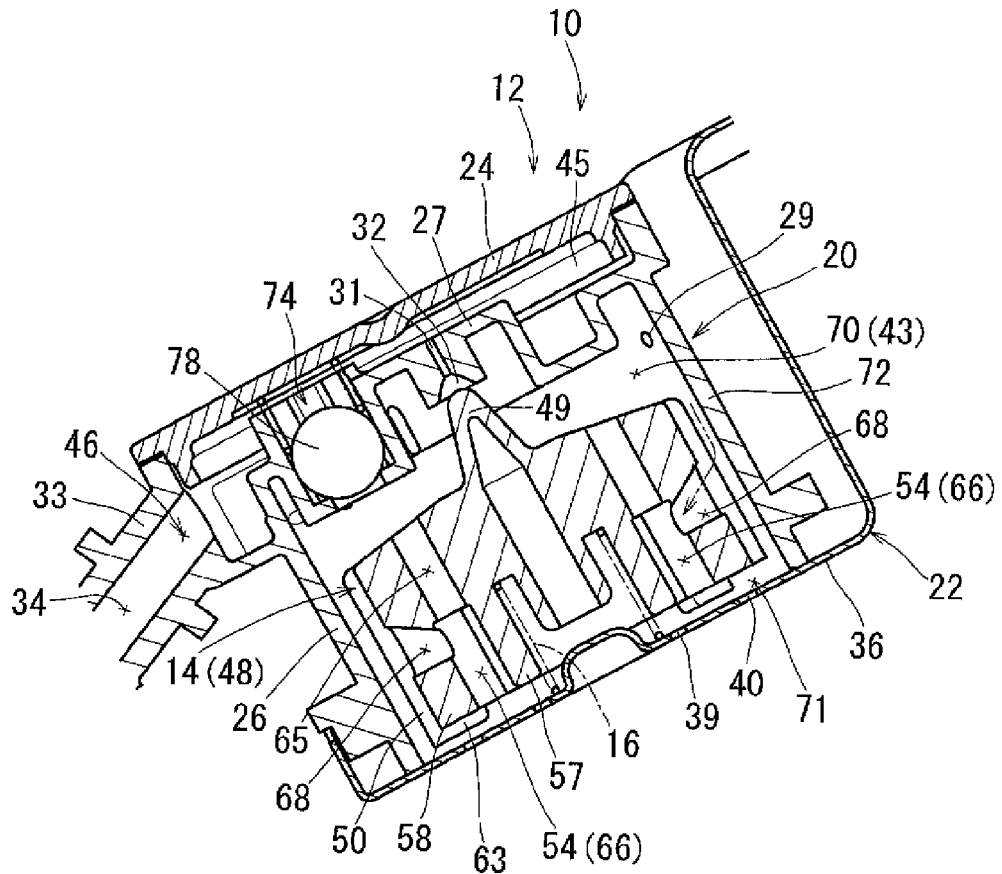
FIG. 11 is a cross-sectional view of the fuel cutoff valve in an inclined state.

FIG. 11 shows an efflux pathway for the fuel in a condition that the fuel cutoff valve 10 is inclined. Each of the upper surfaces for the second communication passage 68 is composed of the inclined surface 68a that has a predetermined inclined angle θ and is inclined upwardly toward outer end in the radial direction (FIG. 8). Thus, for example, when the fuel cutoff valve 10 is inclined such that its right side is higher than the left side and an outer opening of the right second communication passage 68 faces upwardly as shown in FIG. 11, the fuel in an upper area of the connection space 72 higher than the outer opening can easily flow into the second communication passage 68 (refer to two-dot chain arrow in FIG. 11).

As the fuel in the float chamber 43 flows into the fuel tank, the float valve body 14 moves downwardly such that the valve part 49 of the float valve body 14 is moved away from the valve seat 32 of the case 12. Accordingly, the communication hole 31 is opened, i.e., the fuel cutoff valve 10 is opened (FIG. 2).

The inner communication holes 39 and the outer communication holes 40 of the bottom wall 36 are positioned to face the lower surfaces of the middle cylinder portion 57 and the large cylinder portion 58 of the float valve body 14, respectively (FIG. 3). Thus, when the fuel rapidly flows into the lower space 71 of the float chamber 43 via the communication holes 39 and 40 (solid arrows in FIG. 3), the fuel collides against the lower surfaces of the middle cylinder portion 57 and the large cylinder portion 58. Accordingly, it is able to prevent the fuel from flowing into the float chamber 43 rapidly. In addition, when the fluid collides against the lower surface of the middle cylinder portion 57 and the large cylinder portion 58 of the float valve body 14, the float valve body 14 is moved upwardly. Thus, it is able to shorten the period of time for moving the float valve body 14 to the upper position, i.e., the fuel cutoff valve 10 is closed, in order to effectively prevent efflux of the fuel to the exterior of the fuel tank. In a case that the fuel slowly flows into the float chamber 43, because the fuel weakly collides against the lower surface of the float valve body 14 and changes flow direction thereof, the fuel can flow into the lower space 71 of the float chamber 43.

In the state that the vehicle is in the normal condition, because the valve body 78 contacts with the valve seat 77 due to action of the relief spring 79, the relief valve 74 is closed (FIG. 2). When inner pressure of the fuel tank (i.e., inner pressure of the float chamber 43) reaches a predetermined value, the valve body 78 is moved away from the valve seat 77 against the relief spring 79 due to pressing force caused by such inner pressure, and thus the relief valve 74 is opened. Thus, the fuel vapor can flow through the relief passage 76 bypassing the communication hole 31. Therefore, it is able to prevent increase in the inner pressure of the fuel tank above the predetermined value by releasing pressure in the fuel tank to the exterior. When the inner pressure of the fuel tank decreases below the predetermined value, the valve body 78 is contacted with the valve seat 77 due to action of the relief spring 79, i.e., the relief valve 74 is closed.

In accordance with the fuel cutoff valve 10, during discharge the fuel from the float chamber 43, the fuel in the upper space 70 flows through the first communication passage 66 and the connection space 72 and into the lower space 71, and then flows into the fuel tank via the communication holes 39 and 40. At this time, the fuel in the connection space 72 flows into the first communication passage 66 via the second communication passages 68 (dotted arrows in FIG. 3). Thus, it is able to prevent the fuel from remaining in the connection space 72, and thus it is able to improve discharging efficiency of the fuel from the float chamber 43.

The upper edge of each second communication passage 68 of the float valve body 14 is defined by the inclined surface 68a that is inclined upwardly from a side of the first communication passage 66 toward the connection space 72 (FIGS. 3 and 8). Thus, a cross-sectional area of each communication passage 68 expands upwardly toward the connection space 72. Accordingly, when the float valve body 14 is inclined such that the outer opening of at least one of the second communication passage 68 is directed more upwardly, the fuel in the connection space 72 above the outer opening can easily flow into the second communication passage 68 (two-dot chain arrow in FIG. 11). This configuration is effective to prevent the fluid from remaining in the connection space 72.

The inner communication holes 39 and the outer communication holes 40 of the bottom wall 36 for the float chamber 43 are positioned to face the lower surfaces of the middle cylinder portion 57 and the large cylinder portion 58 of the float valve body 14 (FIG. 3). Accordingly, because the fuel rapidly flowing into the float chamber via the communication holes 39 and 40 (solid arrows in FIG. 3) collides against the lower surfaces of the middle cylinder portion 57 and the large cylinder portion 58 of the float valve body 14, it is able to prevent the fluid from rapidly flowing into the float chamber 43.

Figure 12:
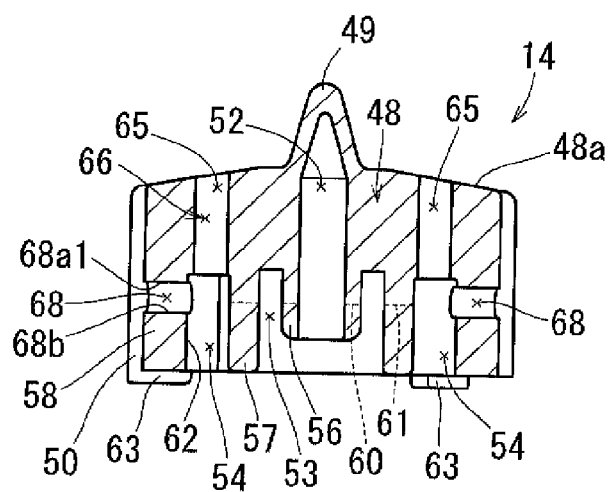
FIG. 12 is a cross-sectional view of a variant of the float valve body.
Figure 13:
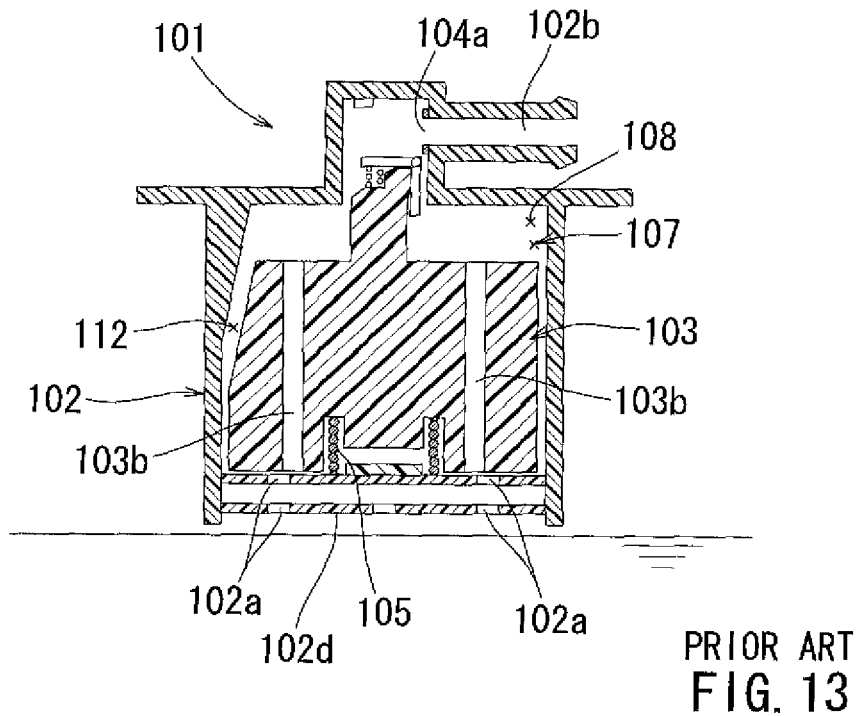
FIG. 13 is a cross-sectional view of a conventional fuel cutoff valve in an open state.
Figure 14:
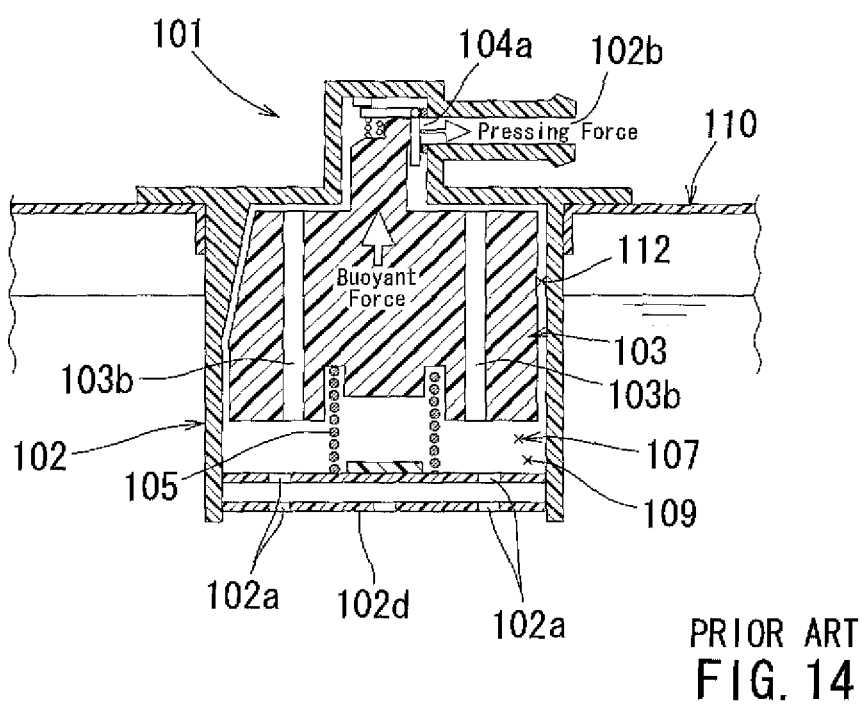
FIG. 14 is a cross-sectional view of the conventional fuel cutoff valve in a closed state.

In the described embodiment, each of the second communication passages 68 is formed in the trapezoidal shape in the vertical cross section. However, the vertical cross-section of the communication passage 68 can be changed as necessary. For example, as shown in FIG. 12, the large cylinder portion 58 has horizontal surfaces 68a1 extending in the horizontal direction instead of the inclined surfaces 68a such that each of the second communication passages 68 has a squire shape in the vertical cross section. On the other hand, the large cylinder portion 85 can have inclined surfaces substantially parallel to the inclined surfaces 68a instead of the horizontal surfaces 68b such that each of the second communication passages 68 has a parallelogram shape in the vertical cross-section.

The fuel cutoff valve 10 can be modified in various ways. For example, shape, size and position for the first communication passage 66 of the float valve body 14 can be varied. In addition, the first communication passage 66 can be composed of a hole passing through the float valve body 14 in the vertical direction by removing the outer annular space 54 in the float valve body 14. Similarly, shape, size and position for the second communication passages 68 can be varied as necessary. The retainer 22 has the inner communication holes 39 and the outer communication holes 40 in the described embodiment, the communication holes 39 and 40 can be formed in another bottom member other than the retainer 22. The communication holes 39 and 40 can be formed to face at least one of the center space 52, the inner annular space 53 and the outer annular space 54. Either the inner communication holes 39 or the outer communication holes 40 can be eliminated.

This invention claims:

1. A fuel cutoff valve comprising:
a housing defining therein a float chamber, a connection passage positioned above the float chamber and fluidly connecting the float chamber with an outside of the housing and a hole positioned below the float chamber fluidly connecting the float chamber with the outside of the housing; and
a float disposed in the float chamber, having a valve part that is configured to close the connection passage and defining therein a first passage passing through the float in a vertical direction and an axis extending through a second passage, the second passage extending from a part of the first passage to an outer surface of the float in a substantial horizontal direction; wherein:
a connection space is defined within the float chamber at a position between the outer surface of the float and an inner surface of the housing;
the second passage has an upper surface inclined upwardly from a side of the first passage toward the connection space, so that the second passages is formed in a trapezoidal shape in a vertical cross-section along the axis.

2. The fuel cut off valve according to claim 1, wherein the hole is positioned to face a lower surface of the float.

* * * * *